United States Patent
Sekine

(10) Patent No.: US 7,700,682 B2
(45) Date of Patent: Apr. 20, 2010

(54) GLASS FILLER FOR POLYCARBONATE RESIN, AND POLYCARBONATE RESIN COMPOSITION

(75) Inventor: Keiji Sekine, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 393 days.

(21) Appl. No.: 11/556,811

(22) Filed: Nov. 6, 2006

(65) Prior Publication Data

US 2007/0112123 A1 May 17, 2007

(30) Foreign Application Priority Data

Nov. 11, 2005 (JP) ............... 2005-328108
Sep. 27, 2006 (JP) ............... 2006-261800

(51) Int. Cl.
- C08K 3/40 (2006.01)
- C03C 6/02 (2006.01)
- C03C 3/076 (2006.01)
- C03C 3/078 (2006.01)
- C03C 3/083 (2006.01)
- C03C 3/087 (2006.01)
- C03C 3/091 (2006.01)

(52) U.S. Cl. .............. 524/494; 165/134.1; 428/412; 428/426; 501/35; 501/37; 501/53; 501/55; 501/68; 501/69; 501/70; 501/72

(58) Field of Classification Search ........ 524/494, 524/26, 28, 588; 65/134.1; 106/50.52, 99; 428/375, 391, 392, 447; 501/35, 36, 38, 501/66, 67, 70, 37, 53, 68, 69, 72

See application file for complete search history.

(56) References Cited

U.S. PATENT DOCUMENTS

| | | | |
|---|---|---|---|
| 3,847,627 A | 11/1974 | Erickson et al. | |
| 4,095,986 A | 6/1978 | Matsuda et al. | |
| 4,542,065 A * | 9/1985 | Gaa ............... | 428/391 |
| 4,882,302 A * | 11/1989 | Horiuchi et al. ....... | 501/27 |
| 5,244,847 A * | 9/1993 | Kushitani et al. ...... | 501/66 |
| 5,789,329 A * | 8/1998 | Eastes et al. ......... | 501/36 |
| RE37,920 E * | 12/2002 | Moffatt et al. ........ | 501/69 |
| 6,933,045 B2 * | 8/2005 | Tamura ............... | 428/364 |
| 2004/0018934 A1 * | 1/2004 | Ott et al. ............ | 501/66 |
| 2005/0049133 A1 * | 3/2005 | Fujiwara et al. ....... | 501/70 |

FOREIGN PATENT DOCUMENTS

| | | |
|---|---|---|
| EP | 0 303 402 A2 | 2/1989 |
| EP | 303402 A2 * | 2/1989 |
| JP | 58-60641 | 4/1983 |
| JP | 5-155638 | 6/1993 |
| JP | 5-294671 | 11/1993 |
| JP | 7-118514 | 5/1995 |
| JP | 9-165506 | 6/1997 |
| JP | 2001122637 A * | 5/2001 |
| WO | WO 02/42233 A2 | 5/2002 |
| WO | WO 2005/110695 A1 | 11/2005 |

OTHER PUBLICATIONS

Machine Translation of JP 05-155638A (1983).*
Machine Translation of JP07-118514A (1995).*
Machine Translation of JP 2001-122637.*
Derwent Publications, AN 1993-232155, XP-002421839, JP05-155638, Jun. 22, 1993 (JP05-155638 previously filed on Nov. 6, 2006).
Derwent Publications, AN 1995-204029, XP-002421840, JP07-118514, May 9, 1995 (JP07-118514 previously filed on Nov. 6, 2006).
Derwent Publications, AN 2002-157186, XP-002421841, JP2001-122637, May 8, 2001.

* cited by examiner

Primary Examiner—Vasu Jagannathan
Assistant Examiner—Darcy D LaClair
(74) Attorney, Agent, or Firm—Oblon, Spivak, McClelland, Maier & Neustadt, L.L.P.

(57) ABSTRACT

A glass filler for a polycarbonate resin, whereby the refractive index of the glass filler can be improved to the same level as a polycarbonate resin, and the transparency of a molded product after reinforced with such a filler can be maintained without coloration, and a polycarbonate resin composition employing such a filler, are provided. The polycarbonate resin composition comprises a polycarbonate resin and a glass filler which comprises, as inorganic components in the entire glass filler, from 50 to 60 mass % of silicon dioxide ($SiO_2$), from 7 to 15 mass % of aluminum oxide ($Al_2O_3$), from 10 to 20 mass % of calcium oxide (CaO), from 0 to 5 mass % of magnesium oxide (MgO), from 2 to 8 masse of zirconium is oxide ($ZrO_2$), from 0 to 10 mass % of zinc oxide (ZnO), from 0 to 10 mass % of strontium oxide (SrO), from 0 to 18 mass % of barium oxide (BaO), from 0 to 2 mass % of lithium oxide ($Li_2O$), from 0 to 2 mass % of sodium oxide ($Na_2O$), and from 0 to 2 mass % of potassium oxide ($K_2O$), provided that the total content of the lithium oxide ($Li_2O$), the sodium oxide ($Na_2O$) and the potassium oxide ($K_2O$) is from 0 to 2 mass % based on the entire glass filler.

8 Claims, No Drawings

GLASS FILLER FOR POLYCARBONATE RESIN, AND POLYCARBONATE RESIN COMPOSITION

The present invention relates to a glass filler for a polycarbonate resin, and a polycarbonate resin composition, to obtain a molded product of a polycarbonate resin which is excellent in transparency and which has yellow coloration suppressed.

A polycarbonate resin is widely used as an industrial transparent material in e.g. the electrical, mechanical and automobile fields, because of its excellent transparency and heat resistance. Further, it is used also for lenses, optical disks, etc. as a plastic for optical materials.

It has been proposed to incorporate various glass fillers in order to control the thermal expansion of such a polycarbonate resin or to further improve the strength.

However, the refractive index (refractive index at a wavelength of 589 nm: hereinafter referred to as nD) of E glass as an example of common glass fiber material to be incorporated in order to reinforce a polycarbonate resin, is at a level of 1.555, while the refractive index of a polycarbonate resin is high at a level of from 1.580 to 1.590. Accordingly, if fiber made of usual E glass is dispersed in a polycarbonate resin, there will be a problem such that the transparency tends to be low due to the difference in the refractive index between the two.

Therefore, a study has been made to maintain the transparency of a molded product of a glass fiber-reinforced polycarbonate resin by improving the refractive index of the glass filler to the same level as the refractive index of a polycarbonate resin by changing the composition of the glass.

For example, Patent Document 1 discloses a glass fiber composition to be used for reinforcement of a polycarbonate resin, which comprises, by mass %, from 50 to 65% of $SiO_2$, from 0 to 6% of $Al_2O_3$, from 0 to 5% of MgO, from 3 to 10% of CaO, from 2 to 10% of BaO, from 0 to 7% of ZnO, from 0 to 5% of SrO, from 3 to 8% of $Na_2O$, from 3 to 8% of $K_2O$, from 0 to 5% of $Li_2O$, from 3 to 10% of $ZrO_2$, and from 5.3 to 10% of $TiO_2$.

Further, Patent Document 2 discloses a glass composition to be used for reinforcement of a polycarbonate resin, which comprises, by mass %, from 54.0 to 62.0% of $SiO_2$, from 8.0 to 12.0% of $Al_2O_3$, from 0 to 5.0% of MgO, from 18.0 to 22.0% of CaO, from 0 to 5.0% of BaO, from 0 to 5.0% of ZnO, from 0 to 1.0% of $Na_2O+K_2O+Li_2O$, from 0.6 to 5.0% of $ZrO_2$, and from 0.5 to 1.9% of $TiO_2$, and which has a refractive index of from 1.5700 to 1.6000.

Further, Patent Document 3 discloses glass fiber for reinforcing a polycarbonate resin, which has a refractive index of from 1.570 to 1.600 and an optical constant of Abbe's number being not more than 50.

Further, a study has been made to improve the polycarbonate resin by means of a commercially available glass fiber. For example, Patent Document 4 discloses a resin composition which comprises an aromatic polycarbonate resin employing a reaction product of a hydroxyaralkyl alcohol with lactone, as a terminal terminator, and a glass filler having a difference of not more than 0.01 in refractive index from the aromatic polycarbonate resin.

Further, Patent Document 5 discloses a resin composition comprising an aromatic polycarbonate resin, a glass fiber having a difference of not more than 0.015 in refractive index from the aromatic polycarbonate resin, and a polycaprolactone.

Patent Document 1: JP-A-58-60641
Patent Document 2: JP-A-5-155638
Patent Document 3: JP-A-5-294671
Patent Document 4: JP-A-7-118514
Patent Document 5: JP-A-9-165506

In the composition of Patent Document 1 among the above prior art references, the content of $TiO_2$ is relatively large at a level of from 5.3 to 10%, whereby the glass filler tends to be yellowing. Accordingly, with a molded product of a polycarbonate resin obtainable by using the glass filler of the glass composition of Patent Document 1, the color tends to be yellowing, and its use used to be restricted in an application where the color is important. Further, the glass filler of Patent Document 1 contains at least 3% of each of sodium oxide ($Na_2O$) and potassium oxide ($K_2O$) as alkali components, and thus, the glass filler tends to be poor in water resistance, as it contains a large amount of alkali components. Accordingly, there has been a problem that the alkali components are likely to elute from the glass filler, and the alkali components eluted from the glass filler tend to react with a polycarbonate resin to lower the molecular weight of the polycarbonate resin, thereby to deteriorate the physical properties of a molded product.

Further, also in the glass composition of Patent Document 2, the content of $TiO_2$ is from 0.5 to 1.9%, whereby the glass filler tends to be yellowing. Therefore, its use used to be restricted in an application where the color is important.

Further, in the glass fiber for reinforcing a polycarbonate resin of Patent Document 3, as shown by the compositions in Examples, sodium oxide ($Na_2O$) and potassium oxide ($K_2O$) being alkali components, are contained in a large amount at a level of at least 16.5 wt %. Accordingly, like in the case of Patent Document 1, there has been a problem that the physical properties of a molded product tend to deteriorate due to a decrease in the molecular weight of the polycarbonate resin.

Further, the aromatic polycarbonate resin composition of Patent Document 4 has had a problem that the raw material for the aromatic polycarbonate resin is expensive, and a molded product thereby obtainable tends to be expensive.

Further, the aromatic polycarbonate resin composition of Patent Document 5 has had a problem such that since it contains a polycaprolactone, the heat resistance or mechanical properties of a molded product tend to deteriorate.

Accordingly, it is an object of the present invention to provide a practically useful glass filler for a polycarbonate, whereby the refractive index of the glass filler can be made to the same level as the refractive index of a polycarbonate resin, the transparency of a molded product of a polycarbonate resin having such a glass filler incorporated can be maintained while suppressing yellow coloration, deterioration of the physical properties of a molded product due to a decrease in the molecular weight of the resin by alkali components on the surface of the glass filler, during the molding, can be suppressed, and its industrial production is possible; and a polycarbonate resin composition employing such a filler.

The present inventor has conducted an extensive study and as a result, has arrived at a glass filler and a polycarbonate resin composition, whereby the above object can be accomplished.

Namely, the glass filler for a polycarbonate resin of the present invention comprises, as inorganic components in the entire glass filler, from 50 to 60 mass % of silicon dioxide ($SiO_2$), from 7 to 15 mass % of aluminum oxide ($Al_2O_3$), from 10 to 20 mass % of calcium oxide (CaO), from 0 to 5 mass % of magnesium oxide (MgO), from 2 to 8 mass % of zirconium oxide ($ZrO_2$), from 0 to 10 mass % of zinc oxide (ZnO), from 0 to 10 mass % of strontium oxide (SrO), from 0 to 18 mass % of barium oxide (BaO), from 0 to 2 mass % of lithium oxide ($Li_2O$), from 0 to 2 mass % of sodium oxide ($Na_2O$), and from 0 to 2 mass % of potassium oxide ($K_2O$), provided that the total content of the lithium oxide ($Li_2O$), the sodium oxide ($Na_2O$) and the potassium oxide ($K_2O$) is from 0 to 2 mass % based on the entire glass filler.

With the glass filler for a polycarbonate resin of the present invention, the difference in refractive index from the polycarbonate resin is very small, and the yellow coloration is little, whereby it is possible to obtain a polycarbonate resin composition excellent in transparency. Further, this glass filler has a small content of alkali components, whereby the alkali components scarcely elute, whereby it is possible to suppress a decrease in the molecular weight of the polycarbonate resin, thereby to prevent deterioration of the physical properties of the molded product.

The glass filler for a polycarbonate resin of the present invention is preferably such that the refractive index of the glass filler is from 1.581 to 1.587 to a light with a wavelength of 589 nm. It is thereby possible to make the difference in refractive index from the polycarbonate resin extremely small and to obtain a polycarbonate resin composition having a higher transparency.

Further, the glass filler for a polycarbonate resin of the present invention preferably contains substantially no boron oxide ($B_2O_3$). In the step of melting the glass composition, boron in the glass melt is likely to vaporize, and by ensuring to contain substantially no boron oxide ($B_2O_3$), it is possible to reduce a load to the environment.

Further, the glass filler for a polycarbonate resin of the present invention preferably contains substantially no titanium oxide ($TiO_2$). It is thereby possible to suppress yellow coloration of the glass filler and to obtain a glass filler which is almost colorless and which has a refractive index close to the refractive index of the polycarbonate resin.

Further, in the glass filler for a polycarbonate resin of the present invention, the content of the zirconium oxide ($ZrO_2$) is preferably from 3 to 6 mass %. It is thereby possible to bring the refractive index of the glass filler close to the refractive index of the polycarbonate resin without impairing the melting property as glass.

Further, in the glass filler for a polycarbonate resin of the present invention, the total content of the silicon dioxide ($SiO_2$) and the aluminum oxide ($Al_2O_3$) is preferably from 57 to 70 mass % based on the entire glass filler. It is thereby possible to obtain a glass filler which is strong and has a good melting property.

Further, in the glass filler for a polycarbonate resin of the present invention, the total content of the lithium oxide ($Li_2O$), the sodium oxide ($Na_2O$) and the potassium oxide ($K_2O$) is preferably from 0 to 1.5 mass % based on the entire glass filler. It is thereby possible to suppress elution of alkali components and to obtain a glass filler excellent in water resistance.

Further, in the glass filler for a polycarbonate resin of the present invention, the total content of the zinc oxide (ZnO), the strontium oxide (SrO) and the barium oxide (BaO) is preferably from 5 to 20 mass % based on the entire glass filler.

Further, in the glass filler for a polycarbonate resin of the present invention, the total content of the calcium oxide (CaO), the zinc oxide (ZnO), the strontium oxide (SrO) and the barium oxide (BaO) is preferably from 25 to 35 mass % based on the entire glass filler.

According to each of the above embodiments, the glass tends to be scarcely devitrified, whereby molding of the filler will be facilitated.

Further, in the glass filler for a polycarbonate resin of the present invention, the content of the barium oxide (BaO) is preferably from 7 to 14 mass % based on the entire glass filler, whereby the melting property at the time of preparing glass will be improved, and the moldability of the filler will accordingly be improved to facilitate fiber-forming.

Further, the glass filler for a polycarbonate resin of the present invention is preferably in the form of fiber, milled fiber, powder or flakes, more preferably in the form of fiber.

On the other hand, the polycarbonate resin composition of the present invention is characterized in that it is a composition comprising the above-mentioned glass filler and a polycarbonate resin. According to the polycarbonate resin composition of the present invention, even after reinforced by the glass filler, the difference between the refractive index of the polycarbonate resin and the refractive index of the above glass filler is very small, whereby it is possible to obtain a molded product having very high transparency and little yellow coloration.

In the polycarbonate resin composition of the present invention, the content of the glass filler is preferably from 5 to 60 mass %. Further, the difference between the refractive index of the polycarbonate resin and the refractive index of the glass filler is preferably not more than 0.001 to a light with a wavelength of 589 nm. Further, when it is formed into a flat plate having a thickness of from 0.1 to 5 mm, the parallel light transmittance is preferably at least 65%.

The glass filler for a polycarbonate resin of the present invention has a very small difference in refractive index from the polycarbonate resin, and has little yellow coloration, whereby it is possible to obtain a polycarbonate resin composition excellent in transparency and close to colorless. Further, this glass filler has a small content of alkali components, whereby the alkali components tend to scarcely elute, and consequently, it is possible to suppress a decrease in the molecular weight of the polycarbonate resin and thereby to prevent deterioration of the physical properties of a molded product.

And, the polycarbonate resin composition of the present invention containing such a glass filler can be formed into a molded product of resin excellent in transparency, color and mechanical strength, and accordingly, it is useful as a molded product required to have both properties of transparency and strength, such as a cover for a display portion of an electric or electronic instrument, or a substitute for a plate glass to be used for an automobile or building material.

Now, the glass filler for a polycarbonate resin and the polycarbonate resin composition of the present invention, will be described in further detail. In the glass composition of the glass filler of the present invention, "%" means "mass %" unless otherwise specified. Further, the constituting components are represented by oxides of the respective components, but the respective components may not necessarily be contained in the form of oxides.

The glass filler for a polycarbonate resin of the present invention is a glass composition comprising, as inorganic components in the entire glass filler, from 50 to 60% of silicon dioxide (hereinafter $SiO_2$), from 7 to 15% of aluminum oxide (hereinafter $Al_2O_3$), from 10 to 20% of calcium oxide (hereinafter CaO), from 0 to 5% of magnesium oxide (hereinafter MgO), from 2 to 8% of zirconium oxide (hereinafter $ZrO_2$), from 0 to 10% of zinc oxide (hereinafter ZnO), from 0 to 10% of strontium oxide (hereinafter SrO), from 0 to 18% of barium oxide (hereinafter BaO), from 0 to 2% of lithium oxide (hereinafter $Li_2O$), from 0 to 2% of sodium oxide (hereinafter $Na_2O$) and from 0 to 2% of potassium oxide (hereinafter $K_2O$), provided that the total content of $Li_2O$, $Na_2O$ and $K_2O$ is from 0 to 2% based on the entire glass filler.

In the above composition of the glass filler, the content of $SiO_2$ is required to be from 50 to 60%. If the content of $SiO_2$ is less than 50%, the strength of the glass filler tends to be low, and if it exceeds 60%, the melting property as glass tends to be low.

The content of $Al_2O_3$ is required to be from 7 to 15%. If the content of $Al_2O_3$ is less than 7%, the chemical durability such as water resistance tends to be low, and if it exceeds 15%, the melting property as glass tends to be low, and the glass tends to be nonhomogeneous.

And, the total content of $SiO_2$ and $Al_2O_3$ is preferably from 57 to 70%, more preferably from 57 to 67%. If the above total content is less than 57%, the strength of the glass filler tends to be low, and if it exceeds 67%, the melting property as glass tends to be low.

The content of CaO is required to be from 10 to 20%, preferably from 15 to 20%. If the content of CaO is less than 10%, the melting property as glass tends to be low, and if it exceeds 20%, devitrification is likely to occur.

MgO is an optional component and may be contained from 0 to 5%, preferably from 0.1 to 5.0%. By incorporating MgO, a part of Ca of the above CaO may be replaced by Mg, whereby the mechanical property such as the strength of the glass filler can be improved. If the content of MgO exceeds 5%, the melting property as glass tends to be low.

The content of $ZrO_2$ is required to be from 2 to 8%, preferably from 3 to 6%. $ZrO_2$ is a component to increase the refractive index of glass, and also is capable of improving the chemical durability of the glass filler. If the content of $ZrO_2$ is less than 2%, it tends to be inadequate to increase the refractive index, and if it exceeds 8%, the melting property as glass tends to be low, and devitrification is likely to occur.

ZnO, BaO and SrO are optional components, and from 0 to 10% of ZnO, from 0 to 18% of BaO and from 0 to 10% of SrO may be contained. By incorporating ZnO, BaO and SrO, it is possible to increase the refractive index of the glass filler, or it is possible to suppress devitrification. And, ZnO, BaO and SrO may be used alone or in combination as a mixture of two or more of them.

Further, BaO has a remarkable effect to lower the melt viscosity of glass, and by increasing the content, the melting property will be good, but the devitrification temperature of glass will not be changed. Accordingly, if the content exceeds 15%, the difference between the temperature for molding and the devitrification temperature tends to be small, and devitrification is likely to occur during the molding. Accordingly, the content of BaO is more preferably from 0 to 15%, and in a case where the glass filler is formed into a fiber form, the content is most preferably from 7 to 14%.

In the present invention, the total content of ZnO, BaO and SrO is preferably from 5 to 20% based on the entire glass filler. If the total content is outside the range, devitrification is likely to occur, and further, if the total content is less than 5%, it tends to be difficult to increase the refractive index. By adjusting the total content of ZnO, BaO and SrO within the above range, it is possible to reduce the difference in refractive index from the polycarbonate resin.

Further, in the present invention, the total content of CaO, ZnO, BaO and SrO is preferably from 25 to 35% based on the entire glass filler. If the total content is less than 25%, it tends to be difficult to increase the refractive index, and if it exceeds 35%, devitrification is likely to occur, and molding of the filler tends to be difficult.

Each of $Li_2O$, $Na_2O$ and $K_2O$ (hereinafter referred to also as an "alkali component") may be contained from 0 to 2%, and the total content of such alkali components, is required to be from 0 to 2% based on the entire glass filler. If the total content of such alkali components exceeds 2%, water resistance of glass tends to be low, and the alkali is likely to elute.

Further, the molecular weight of the polycarbonate resin tends to decrease by alkali components on the glass surface during the molding, which will be a factor for deterioration of the physical properties of the molded product. And, the total content of such alkali components is preferably from 0 to 1.5%, and with a view to improvement of the melting property of the glass composition, it is more preferably from 0.1 to 1.5%.

Even if the total content of such alkali components is low, by incorporating $ZrO_2$ in an amount of from 2 to 8%, as mentioned above, it is possible to sufficiently improve the refractive index of the glass filler to bring it close to the refractive index of the polycarbonate resin. And, as the alkali components are little, it is possible to suppress the decrease in the molecular weight by the decomposition of the polycarbonate resin, whereby it is possible to prevent deterioration of the physical property such as the strength of a molded product.

In the glass filler of the present invention, it is preferred that substantially no titanium oxide (hereinafter $TiO_2$) is contained. $TiO_2$ is a component to increase the refractive index, but by incorporating $TiO_2$, the glass filler tends to be colored yellow. Accordingly, by incorporating substantially no $TiO_2$, it is possible to obtain a glass filler having yellow coloration suppressed and being close to colorless. Further, in the present invention, "contains substantially no $TiO_2$", means that the content of $TiO_2$ is not higher than 0.1%.

Further, in the glass filler of the present invention, it is preferred that substantially no boron oxide (hereinafter $B_2O_3$) is preferably contained. Boron in the glass melt tends to be readily volatilized, and accordingly it is possible to reduce a load to the environment by incorporating substantially no $B_2O_3$. Further, in the present invention, "contains substantially no $B_2O_3$" means that the content of $B_2O_3$ is not higher than 0.1%.

Here, as mentioned above, $ZrO_2$, BaO, CaO and SrO are components which are capable of increasing the refractive index of glass, and $SiO_2$ and $Al_2O_3$ are components capable of lowering the refractive index of glass. Further, as components capable of increasing the refractive index of glass, other than the above-mentioned, $TiO_2$, $Ta_2O_5$, $La_2O_3$, etc. may be mentioned, and as components capable of lowering the refractive index of glass other than the above-mentioned, $P_2O_5$, $F_2$, etc. may be mentioned.

Accordingly, in a case where the refractive index of glass is smaller than the desired refractive index i.e. the refractive index of the polycarbonate resin, for example, a part of the $SiO_2$ content may be replaced by $ZrO_2$, whereby the refractive index can be increased. Specifically, for example, if 0.4% of $SiO_2$ is replaced by 0.4% of $ZrO_2$, the refractive index of glass will increase by about 0.002.

Further, in a case where the refractive index of glass is larger than the desired refractive index i.e. the refractive index of the polycarbonate resin, for example, a part of the BaO content may be replaced by MgO or SrO, whereby the refractive index can be lowered.

Specifically, for example, if 1.0% of BaO is replaced by 1.0% of MgO, the refractive index of glass will decrease by about 0.002. Further, if 1.5% of BaO is replaced by 1.5% SrO, the refractive index of glass will decrease by about 0.002.

In such a manner, by properly replacing a component capable of increasing the refractive index of the glass and a component capable of lowering the refractive index of glass, within the ranges of the present invention, respectively, for adjustment, it is possible to properly adjust the refractive index of glass and thereby to obtain a glass filler having a refractive index within the same range as the refractive index of a usual polycarbonate resin.

And, the glass filler for a polycarbonate resin of the present invention, composed of the above composition, preferably has a refractive index of from 1.581 to 1.587, more preferably from 1.583 to 1.586, to a light within a wavelength of 589 nm.

Further, the glass filler for a polycarbonate resin of the present invention is preferably such that the YI value measured by a transmission method in accordance with the method of JIS K-7105 with respect to a glass plate having a thickness of 3 mm prepared from the glass filler, is preferably from 0 to 3. By incorporating substantially no Ti as a raw material of glass, it is possible to suppress yellow coloration, and the YI value can be made to be within the above range.

Thus, with the glass filler of the present invention, the refractive index can sufficiently be improved as compared with the refractive index (refractive index at a wavelength of 589 nm: nD) of usual E glass being about 1.555, and coloration of the glass filler itself is little, whereby when it is incorporated to a polycarbonate resin, it is possible to obtain a resin composition having high transparency.

The glass filler for a polycarbonate resin of the present invention may contain, in addition to the above-mentioned glass components, the following components within a range not to adversely affect the optical properties such as the refractive index, the water resistance, the glass melting property, the moldability, the mechanical properties, etc. For example, as a component to increase the refractive index of glass, it may contain an oxide containing an element such as lanthanum (La), yttrium (Y), lead (Pb), bismuth (Bi), antimony (Sb), tantalum (Ta) or tungsten (W). In a case where it contains such components, the content is preferably less than 3% based on the entire glass filler, in order to suppress the cost of raw material. Among the above components, an oxide containing Pb should better be not substantially contained with a view to reducing the load to the environment.

In the glass raw material required to obtain the glass filler for a polycarbonate resin of the present invention, the content of components containing iron (Fe) and/or chromium (Cr), as impurities in the raw material, is preferably less than 0.01%, as an oxide of Fe and/or Cr, based on the entire glass, with a view to suppressing coloration of the glass.

As the glass material required to obtain the glass filler for a polycarbonate resin of the present invention, it is preferred to employ a raw material containing a carbonate, a nitrate or a sulfate in order to improve the melting property of glass while suppressing coloration of the glass.

And, in the present invention, the glass filler is preferably employed in the form of glass fiber, glass powder, glass flakes, milled fiber or glass beads. The glass fiber is highly effective for reinforcing the polycarbonate resin while having the drawing property, mechanical strength, etc. equal to the conventional fiber for reinforcement such as E glass fiber or C glass fiber, and accordingly, it is more preferably employed as such glass fiber.

The glass fiber can be obtained by means of a conventional drawing method for glass long fiber. For example, the glass may be formed into fiber by means of various methods such as a direct melt (DM) method wherein glass raw material is continuously vitrified in a melting furnace, then led to a forehearth, followed by drawing through a bushing attached at the bottom of the forehearth, or a re-melting method wherein molten glass is processed into a marble, cullet or rod shape, then re-melted, followed by drawing. Here, in a case where the difference between the drawing temperature at the time of forming the glass fiber and the devitrification temperature of the glass, is small, the glass is likely to be devitrified during the drawing of the glass fiber, whereby the productivity of the fiber will deteriorate. Therefore, it is necessary to design the composition of the glass so that the drawing temperature is sufficiently higher than the devitrification temperature. For example, in a case where the drawing temperature is set to be a temperature where the melt viscosity of glass is $10^{3.0}$ poise, the difference between the drawing temperature and the devitrification temperature of the glass is preferably at least 50° C.

The diameter of the glass fiber is not particularly limited, but a diameter of from 3 to 25 μm is preferably employed. If the diameter is less than 3 μm, the contact area between the glass fiber and the resin increases, which causes diffuse reflection, whereby the transparency of a molded product is likely to deteriorate. If the diameter is more than 25 μm, the strength of the glass fiber tends to be weak, and consequently, the strength of a molded product is likely to be low.

The form of the glass fiber is not particularly limited and can be suitably selected depending upon the forming method or the characteristics required for a molded product. For example, it may be chopped strand, roving, mat, cloth or milled fiber.

Glass powder may be obtained by a conventional production method. For example, the glass raw material may be melted in a melting furnace, and the melt is put into water for pulverization by water, or the melt is formed into a sheet by cooling rolls, and the sheet is pulverized, to obtain a powder having a desired particle size. The particle size of the glass powder is not particularly limited, but one having a particle size of is from 1 to 100 μm is preferably employed.

Glass flakes may be obtained by a conventional production method. For example, glass raw material may be melted in a melting furnace, and the melt is drawn into a tube to make the thickness of glass to be constant, followed by pulverization by rolls to obtain frit having a specific thickness, and the frit is pulverized to obtain flakes having a desired aspect ratio. The thickness and aspect ratio of the glass flakes are not particularly limited, but flakes having a thickness of from 0.1 to 10 μm and an aspect ratio of from 5 to 150, are preferably employed.

Milled fiber may be obtained by a conventional method for producing milled fiber. For example, glass fiber strand may be pulverized by a hammer mill or ball mill to obtain milled fiber. The fiber diameter and aspect ratio of the milled fiber are not particularly limited, but one having a fiber diameter of from 5 to 50 μm and an aspect ratio of from 2 to 150 is preferably employed.

Glass beads may be obtained by a conventional production method. For example, glass raw material may be melted in a melting furnace, and the melt is sprayed by a burner to form glass beads having a desired particle diameter. The particle diameter of the glass beads is not particularly limited, but glass beads having a diameter of from 5 to 300 μm are preferably employed.

And, in the present invention, the glass filler is preferably surface-treated with a treating agent containing a coupling agent in order to increase the affinity between the polycarbonate resin and the glass filler to increase the adhesion thereby to suppress deterioration of the transparency of a molded product due to formation of void spaces. As such a coupling agent, a silane coupling agent, a borane coupling agent, an aluminate coupling agent or a titanate coupling agent may, for example, be used. It is particularly preferred to employ a silane coupling agent, whereby the adhesion of the polycarbonate resin and the glass will be excellent. As such a silane coupling agent, an aminosilane coupling, an epoxysilane coupling agent or an acrylsilane coupling agent may, for example, be used. Among such silane coupling agents, it is most preferred to employ an aminosilane coupling agent.

Further, as components other than the coupling agent contained in the treating agent, a film former, a lubricant and an antistatic agent may, for example, be mention, and these components may be used alone or in combination as a mixture of two or more of them.

As the film former, it is possible to employ a polymer such as a vinyl acetate resin, a urethane resin, an acrylic resin, a polyester resin, a polyether resin, a phenoxy resin, a polyamide resin, an epoxy resin or a polyolefin resin, or a modified product thereof, and a urethane resin is preferred. By using a urethane resin, it is possible to obtain a polycarbonate resin composition excellent in transparency. The reason is not clearly understood, but it is considered that at the interface between the polycarbonate resin and the glass filler, the strain due to the difference in thermal expansion between the resin and the glass can be reduced. Further, as the urethane resin, it is preferred to employ a urethane resin which undergoes little color change by heat. By using such a urethane resin, it is possible to obtain a polycarbonate resin composition having little coloration. And, as the urethane resin which undergoes little color change by heat, a polyester non-yellowing type urethane resin may, for example, be preferably mentioned.

As the lubricant, an aliphatic ester, aliphatic ether, aromatic ester or aromatic ether surfactant may be employed. As the antistatic agent, an inorganic salt such as lithium chloride or potassium iodide, or an ammonium chloride or ammonium ethosulfate quaternary ammonium salt may be employed.

The polycarbonate resin composition of the present invention is a resin composition comprising the above-described glass filler and a polycarbonate resin. The polycarbonate resin is not particularly limited, and for example, one obtainable by reacting bisphenol A with phosgene may, for example, be used. Its viscosity average molecular weight is preferably from 12,000 to 35,000.

The refractive index (nD) to a light with a wavelength of 589 nm, of the polycarbonate resin, is usually within a range of from 1.580 to 1.590. As the polycarbonate resin to be used in the present invention, a conventional polycarbonate resin may be employed. As a resin preferably employed, for example, "LEXAN 121R" (tradename, GE Plastics Japan, Ltd.) having a refractive index of 1.585 or "Iupilon S-2000" (tradename, Mitsubishi Engineering-Plastics Corporation) having a refractive index of 1.583 may be mentioned.

And, the polycarbonate resin composition of the present invention is preferably such that the difference between the refractive index of the polycarbonate resin and the refractive index of the glass filler is not more than 0.001 to a light with a wavelength of 589 nm. If the difference between the refractive index of the polycarbonate resin and the refractive index of the glass filler exceeds 0.001, the transparency tends to be inadequate, when the composition is formed into a molded product.

Further, the polycarbonate resin composition of the present invention, when formed into a flat plate having a thickness of from 0.1 to 5 mm, preferably has a parallel light transmittance of at least 65%, more preferably at least 70%. The glass filler of the present invention having the above composition, to be used for the polycarbonate resin composition of the present invention, has a refractive index which is very close to the refractive index of the polycarbonate resin, and further, the color of the glass filler is close to colorless and is one having yellow coloration suppressed. Accordingly, the obtainable polycarbonate resin molded product is excellent in a color developing property by a pigment, dye or metallic tone, and can be suitably employed as a molded product at a site where an ornamental design property or the like is required. Here, in the present invention, the parallel light transmittance is a value measured in accordance with JIS K-7361 and JIS K-7105 A.

In order to bring the parallel light transmittance within the above-mentioned range, by the above-mentioned methods, the refractive index of the glass filler is made to be close to the refractive index of the polycarbonate resin, and coloration of the glass is suppressed, and, as described hereinafter, molding is carried out so that the surface roughness of a molded product will be small, for example, molding is carried out by forming a layer (a skin layer) having a high ratio of the resin on the outermost surface of the molded product.

The content of the glass filler in the polycarbonate resin composition of the present invention is not particularly limited, but it is preferably from 5 to 60 mass %, more preferably from 10 to 55 mass %. If it is less than 5 mass %, the effect for suppressing the thermal expansion tends to be inadequate, and improvement of the mechanical property due to inadequate reinforcement, tends to be inadequate, and if it exceeds 60 mass %, the contact area between the resin and the glass filler increases, whereby the transparency of a molded product tends to deteriorate, and the melt flowability of the resin composition during the molding tends to deteriorate, whereby the appearance of the molded product tends to deteriorate.

Further, to the polycarbonate resin composition of the present invention, well known additives may be incorporated within a range not to impair the properties such as the refractive index. For example, an antioxidant is capable of suppressing decomposition of the resin during the molding or during the production of the polycarbonate resin composition.

The polycarbonate resin composition of the present invention can be produced by means of a conventional method. For example, a melt kneading method or a plutrusion method may preferably be employed.

The melt kneading method is a method wherein the resin in a molten state, the glass filler and optional additives are kneaded by an extruder. Such a melt kneading method includes a method (a side feeding method) wherein the resin is melted by a twin extruder, and the glass filler is introduced from a feed inlet on the way, and a method (a premix method) wherein the resin and the glass filler preliminarily blended by a twin screw or single screw extruder, are melt-kneaded with optional additives. In the above side feed method, the optional additives may be preliminarily mixed with the resin or preliminarily mixed with the glass filler, depending upon the nature.

The pultrusion method is preferably employed in a case where the form of the glass filler is glass long fiber, and the molded product to be obtained is required to have high mechanical strength. The plutrusion method is one wherein while continuous glass long fiber strands are drawn, the resin to form the matrix is impregnated to the fiber strands, and it includes a method wherein fiber strands are passed through an impregnation bath containing a solution of the matrix resin to impregnate the resin, a method wherein a powder of the matrix resin is sprayed on fiber strands, or fiber strands are passed through a tank containing the powder to attach the matrix resin powder to the fiber strands, and then, the matrix resin is melted and impregnated into the fiber strands, and a method wherein while fiber strands are passed through a crosshead, the matrix resin is supplied to the crosshead from e.g. an extruder to have the resin impregnated into the fiber strands. Preferred is a method employing the crosshead.

The polycarbonate resin composition thus obtained is subjected to a conventional molding method such as injection molding, extrusion molding, compression molding or calendering to obtain a molded product of a polycarbonate resin. Further, the molding may be carried out by means of a mold having the interior covered with a resin film or a resin sheet.

At that time, the thickness of the molded product may be optional, but especially in the case of a molded product required to be transparent, it is necessary to adjust the thickness to from 0.1 to 5 mm, more preferably from 0.2 to 2 mm. If the thickness of the molded product is less than 0.1 mm, warpage is likely to result, and the mechanical strength tends to be weak, and molding tends to be difficult. On the other hand, if it is more than 5 mm, the transparency tends to be impaired.

And, it is preferred that on the surface of the molded product, a coating film such as a hard coat film, an antifogging film, an antistatic film or an antireflection film is formed, and a composite coating film composed of two or more of them may be formed. Among them, it is particularly preferred that a coating film of a hard coat film is formed, since the weather resistance is thereby excellent, and it is possible to prevent abrasion of the surface of the molded product with time. The material for the hard coat film is not particularly limited, a known material such as an acrylate hard coat agent, a silicone hard coat agent or an inorganic hard coat agent, may be employed.

The conditions for production of the polycarbonate resin composition, and the condition for molding it into a molded product of polycarbonate resin can suitably be selected and are not particularly limited. However, the heating temperature during the melt kneading or the temperature of the resin during the injection molding are usually preferably selected within a range of from 220° C. to 300° C. in order to avoid decomposition of the resin.

In a case where at least part of the glass filler is present on the outer surface of a molded product, the surface roughness of the molded product tends to be large, and diffuse reflection on the surface of the molded product tends to be substantial, and consequently, the transparency of the molded product may deteriorate. Therefore, as a method to minimize the surface roughness of the molded product, there is a method wherein a layer (skin layer) having a high ratio of the resin is formed on the outermost surface of the molded product, to reduce the surface roughness of the molded product. As a method for forming such a skin layer, in the case of injection molding, the temperature of the mold can be made higher than a usual condition, whereby the resin in contact with the mold tends to be easily flow, whereby the surface roughness of the outermost surface of the molded product can be made small. Further, in the case of press molding, it is possible to reduce the surface roughness of the outermost surface of the molded product, by adjusting the pressure during the molding to be higher than the usual condition. By reducing the surface roughness of the molded product by the above method, diffuse reflection on the surface of the molded product can be made small, the haze will be small, and consequently, the transparency of the molded product can be improved.

And, molded products of polycarbonate resin obtainable by molding the polycarbonate resin composition of the present invention are useful at sites where durability is required. For example, 1) optical materials such as optical lenses, optical mirror, prisms or light diffusion plates, and materials for electric/electronic components, and 2) medical components, such as liquid drug containers for injection, vials, ampuls, prefilled syringes, transfusion bags, containers for drugs or containers for medical samples, may be mentioned. Further, they may be useful also at sites where the interior of the molded products is required to be distinguished, for example, as outside plates, housings or opening materials. Specifically, 3) components for precision equipments, such as cases and covers for e.g. precision machines such as cell-phones, PDA, cameras, slide projectors, watches, calculators, meters or display equipments, 4) components for electric equipments, such as various components for e.g. televisions, radio cassettes, video cameras, video recorders, audio players, DVD players, telephones, displays, computers, registers, copying machines, printers or facsimile machines, outside plates, and various components for housings, 5) components for automobiles, such as sunroofs, doorvisors, rear windows or side windows, 6) building components such as glass for buildings, sound-proofing walls, carports, sunrooms and grating, and 7) household components such as lighting covers or blinds, and interior equipments, may, for example, be mentioned.

Now, the present invention will be described in further detail with reference to Examples.

Preparation of Glass Cullets

Glass cullets of Preparation Examples 1 to 14 were prepared with compositions (mass %) as shown in Tables 1 and 2. With respect to the obtained glass cullets, the melting property of glass, and the color (value a, value b and value YI) were measured. The results are also shown in Tables 1 and 2. Here, with respect to the melting property of glass, glass raw material prepared to have the prescribed glass composition was melted at 1,550° C. for 4 hours, whereupon the presence or absence of non-dissolved substances was visually judged. Further, for the color (value a, value b and value YI), a test piece having a thickness of 3 mm was measured by a transmission method in accordance with the method of JIS K-7105 employing Σ90, manufactured by Nippon Denshoku Co., Ltd.

TABLE 1

| | | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 |
|---|---|---|---|---|---|---|---|---|---|
| Composition (mass %) | $SiO_2$ | 51.3 | 50.4 | 54.4 | 54.0 | 57.5 | 50.5 | 50.5 | 57.5 |
| | $Al_2O_3$ | 9.6 | 9.4 | 8.2 | 11.5 | 12.0 | 9.2 | 7.0 | 7.4 |
| | CaO | 16.2 | 15.9 | 18.9 | 19.5 | 21.0 | 17.0 | 15.5 | 12.2 |
| | MgO | 1.4 | 1.7 | 0.9 | 1.8 | 2.5 | 1.4 | 0.6 | 0.9 |
| | $Na_2O$ | 0.6 | 0.6 | 0.6 | 0.7 | 0.5 | 0.6 | 0.6 | 0.6 |
| | $K_2O$ | 0.4 | 0.4 | 0.6 | 0.4 | 0 | 0.4 | 0.4 | 0.4 |
| | $Li_2O$ | 0 | 0 | 0 | 0 | 0 | 0 | 0 | 0 |
| | $TiO_2$ | 0 | 0 | 0 | 0 | 5.0 | 0 | 0 | 0 |
| | $ZrO_2$ | 5.5 | 4.2 | 4.8 | 7.4 | 0 | 1.4 | 0 | 9.8 |
| | ZnO | 0 | 0 | 3.7 | 0 | 1.5 | 0 | 0 | 0 |
| | BaO | 8.9 | 17.4 | 8.0 | 4.6 | 0 | 19.5 | 25.4 | 6.7 |
| | SrO | 6.0 | 0 | 0 | 0 | 0 | 0 | 0 | 4.5 |

TABLE 1-continued

|  |  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 |
|---|---|---|---|---|---|---|---|---|---|
| Melting property | | No | No | No | No | No | No | No | Yes |
| Color difference | Value YI | 1.85 | — | — | — | 12.6 | — | — | — |
| | Value a | −0.48 | — | — | — | −1.43 | — | — | — |
| | Value b | 1.04 | — | — | — | 7.04 | — | — | — |

TABLE 2

|  |  | Prep. Ex. 9 | Prep. Ex. 10 | Prep. Ex. 11 | Prep. Ex. 12 | Prep. Ex. 13 | Prep. Ex. 14 |
|---|---|---|---|---|---|---|---|
| Composition (mass %) | $SiO_2$ | 52.0 | 53.3 | 52.4 | 53.0 | 55.3 | 56.3 |
| | $Al_2O_3$ | 9.9 | 10.0 | 9.8 | 9.8 | 8.4 | 8.6 |
| | CaO | 16.7 | 16.9 | 16.5 | 16.6 | 19.2 | 19.6 |
| | MgO | 1.8 | 1.4 | 1.7 | 1.7 | 0.9 | 1.9 |
| | $Na_2O$ | 0.7 | 0.7 | 0.7 | 0.7 | 0.6 | 0.6 |
| | $K_2O$ | 0.4 | 0.4 | 0.4 | 0.4 | 0.6 | 0.5 |
| | $Li_2O$ | 0 | 0 | 0 | 0 | 0 | 0 |
| | $TiO_2$ | 0 | 0 | 0 | 0 | 0 | 0 |
| | $ZrO_2$ | 3.9 | 5.7 | 4.4 | 3.7 | 4.9 | 5.0 |
| | ZnO | 0 | 0 | 0 | 0 | 3.7 | 3.8 |
| | BaO | 10.1 | 7.2 | 14.1 | 14.1 | 6.4 | 3.7 |
| | SrO | 4.5 | 4.4 | 0 | 0 | 0 | 0 |
| Melting property | | No | No | No | No | No | No |
| Color difference | Value YI | 1.70 | 1.89 | 1.77 | — | — | — |
| | Value a | −0.39 | −0.53 | −0.43 | — | — | — |
| | Value b | 1.02 | 1.08 | 1.04 | — | — | — |

From the results in Tables 1 and 2, the glass cullets of Preparation Examples 1 to 4 and 6 to 14 were ones having extremely little yellow coloration as compared with the glass cullet of Preparation Example 5 containing $TiO_2$. Further, the glass cullets of Preparation Examples 2 to 4 and 6 to 14 had colors of the same level as the glass cullet of Preparation Example 1 by visual observation.

Further, with the glass cullet of Preparation Example 8 wherein the content of $ZrO_2$ exceeded the upper limit of the present invention, a non-dissolved substance was observed in the judgment of the melting property, and vitrification was difficult.

Preparation of Glass Fillers (Glass Fibres)

EXAMPLES 1 TO 9

Using the glass cullets of the above Preparation Examples 1 to 4, 9 and 11 to 14, glass fibers of Examples 1 to 8 were prepared. The glass fibers were drawn with a fiber diameter of 13 μm by a conventional method, and as a binder, aminosilane+polyester non-yellowing urethane resin was added in an amount of 0.5 mass %.

EXAMPLE 10

Using the glass cullet of the above Preparation Example 9, the glass fiber of Example 10 was prepared. The glass fiber was drawn with a fiber diameter of 13 μm by a conventional method, and as a binder, aminosilane+bisphenol A epoxy resin was added in an amount of 0.5 mass %.

EXAMPLE 11

Using the glass cullet of the above Preparation Example 9, the glass fiber of Example 11 was prepared. The glass fiber was drawn with a fiber diameter of 13 μm by a conventional method, and as a binder, aminosilane+acrylic resin was added in an amount of 0.5 mass %.

COMPARATIVE EXAMPLES 1 TO 4

Using the glass cullets of the above Preparation Examples 5 to 8, glass fibers of Comparative Examples 1 to 4 were prepared. The glass fibers were drawn with a fiber diameter of 13 μm by a known method, and as a binder, aminosilane+polyester non-yellowing urethane resin was added in an amount of 0.5 mass %.

With respect to the obtained glass fibers, the refractive indices and the Abbe numbers were measured. The results are shown in Tables 3 and 4.

Further, for the refractive index (nD) to a light with a wavelength of 589 nm of glass fiber, a test specimen was measured by a dipping method by method B of JIS K-7142. Further, the Abbe number was obtained by calculation by the formula $v=(nD-1)/(nF-nC)$ by using the refractive indices at wavelengths of 486 nm (nF), 589 nm (nD) and 656 nm (nC) (at least 4 digits after decimal point) are required. Further, the drawing property was evaluated under such standards that when the glass cullet was formed into fiber, an excellent case was represented by ⊚, a good case was represented by ○, a case where the drawing efficiency was poor, was represented by Δ, and a case where drawing was impossible, was represented by X.

TABLE 3

|  | Ex. 1 | Ex. 2 | Ex. 3 | Ex. 4 | Ex. 5 | Ex. 6 | Ex. 7 |
|---|---|---|---|---|---|---|---|
| Glass cullet used | Prep. Ex. 1 | Prep. Ex. 2 | Prep. Ex. 3 | Prep. Ex. 4 | Prep. Ex. 9 | Prep. Ex. 11 | Prep. Ex. 12 |
| Refractive index (nD) | 1.585 | 1.584 | 1.585 | 1.585 | 1.585 | 1.584 | 1.581 |
| Abbe number | 58 | 58 | 58 | 59 | 58 | — | — |
| Drawing property | ○ | *○ high drawing temperature | ○ | Δ | ⊚ | *○ high drawing temperature | *○ high drawing temperature |

TABLE 4

|  | Ex. 8 | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|
| Glass cullet used | Prep. Ex. 13 | Prep. Ex. 14 | Prep. Ex. 9 | Prep. Ex. 9 | Prep. Ex. 5 | Prep. Ex. 6 | Prep. Ex. 7 | Prep. Ex. 8 |
| Refractive index (nD) | 1.584 | 1.581 | 1.585 | 1.585 | 1.585 | 1.576 | 1.577 | 1.576 |
| Abbe number | — | — | 58 | 58 | 52 | 58 | 58 | 62 |
| Drawing property | Δ | Δ | ⊚ | ⊚ | ○ | ○ | ○ | X |

The glass fiber in Comparative Example 1 produced from the glass cullet containing $TiO_2$ (Preparation Example 5) had a refractive index of 1.585, which was close to the refractive index of the polycarbonate resin, and the drawing property was good, but it was colored yellow.

The glass fibers in Comparative Examples 2 and 3 employing the glass cullets containing no $TiO_2$ and further, having a $ZrO_2$ content of less than the lower limit value of the present invention (Preparation Examples 6 and 7), had low refractive indices which were less than 1.581.

Whereas, the glass fibers in Examples 1 to 11 employing the glass cullets having the compositions of the present invention (Preparation Examples 1 to 4, 9 and 11 to 14) were free from coloration of glass and could be drawn to form fibers, and their refractive indices were from 1.581 to 1.585, which was close to the refractive index of the polycarbonate resin.

In Examples 2, 6 and 7, the drawing property was good, but the drawing temperature was high as compared in Example 1.

Further, the glass fiber in Example 7 employing the glass cullet of Preparation Example 12 had a refractive index of 1.581, while the glass fiber in Example 6 employing the glass cullet of Preparation Example 11 obtained by changing mainly the ratio of the $SiO_2$ amount to the $ZrO_2$ amount, had a refractive index of 1.584.

Further, the glass fiber in Example 9 employing the glass cullet of Preparation Example 14 had a refractive index of 1.581, while the glass fiber in Example 8 employing the glass cullet in Preparation Example 13 obtained by mainly changing the ratio of the $SiO_2$ amount, the BaO amount and the MgO amount, had a refractive index of 1.584.

Preparation of Molded Products of Glass Fiber-Reinforced Polycarbonate Resin

Using the glass fibers of Examples 1, 5, 10 and 11 and Comparative Example 1, compounding and injection molding were carried out under the following conditions to prepare molded products of glass fiber-reinforced polycarbonate resin.

Compounding Conditions

Polycarbonate resin: LEXAN 121R (manufactured by GE Plastics Japan, Ltd., molecular weight: 21,000, nD=1.585)

Glass fiber: Chopped strand having a diameter of 13 μm and a length of 3 mm, number of bundled filaments: 400 filaments.

Content of glass fiber: 10 mass %, 20 mass %

Extruder: TEM-35B (manufactured by Toshiba Machine Co., Ltd.)

Extrusion temperature: 280° C.

Injection Molding Conditions

Molding machine: IS-80G (manufactured by Toshiba Machine Co., Ltd.)

Cylinder temperature: 300° C.

Mold temperature: 120° C.

The optical properties and mechanical properties of the above molded products of resin are summarized in Table 5. Here, the total light transmittance and the parallel light transmittance being optical properties, were values obtained by measuring a sample having a thickness of 2 mm in accordance with JIS K-7361 by means of NDH sensor manufactured by Nippon Denshoku Co., Ltd, and the haze value is a value obtained by measuring a sample having a thickness of 2 mm in accordance with method A of JIS K-7105 by means of NDH sensor manufactured by Nippon Denshoku Co., Ltd. Further, the color (value L, value a, value b and value YI) is a value obtained by measuring a test specimen having a thickness of 3 mm by a reflection method in accordance with JIS K-7105 employing Σ90, manufactured by Nippon Denshoku Co., Ltd. Further, the flexural strength and the flexural modulus of elasticity as mechanical properties, are values obtained by measuring a sample having a thickness of 3 mm in accordance with ASTM D-790.

TABLE 5

|  |  | Example 12 | Example 13 | Example 14 | Example 15 | Example 16 | Comparative Example 5 | Comparative Example 6 |
|---|---|---|---|---|---|---|---|---|
| Glass fiber used |  | Example 1 | Example 1 | Example 5 | Example 10 | Example 11 | Comparative Example 1 | Comparative Example 1 |
| Content of glass (mass %) |  | 10 | 20 | 20 | 20 | 20 | 10 | 20 |
| Optical properties | Haze (%) | 9.5 | 24.7 | 24.2 | 35.3 | 43.5 | 13.9 | 32.1 |
|  | Parallel light transmittance (%) | 80.7 | 65.2 | 66.6 | 53.6 | 43.8 | 75.0 | 57.4 |
|  | Total light transmittance (%) | 89.2 | 86.5 | 87.6 | 86.1 | 85.3 | 87.1 | 84.5 |
| Color | Value YI | 11.9 | 18.5 | 17.4 | 24.3 | 39.4 | 14.0 | 21.2 |
|  | Value L | 80.3 | 75.3 | 76.3 | 74.3 | 70.7 | 79.3 | 74.1 |
|  | Value a | 0.11 | −0.14 | −0.19 | −0.46 | 0.12 | 0.07 | −0.05 |
|  | Value b | 4.98 | 7.73 | 7.71 | 10.89 | 17.51 | 6.05 | 9.52 |

TABLE 5-continued

| | | Example 12 | Example 13 | Example 14 | Example 15 | Example 16 | Comparative Example 5 | Comparative Example 6 |
|---|---|---|---|---|---|---|---|---|
| Mechanical properties | Flexural strength (MPa) | 127 | 158 | 158 | 155 | 135 | 119 | 150 |
| | Flexural modulus of elasticity (MPa) | 3705 | 5822 | 5720 | 5520 | 5447 | 3824 | 5780 |

From Table 5, it is evident that the molded products of Examples have mechanical properties of the same level as in Comparative Examples, the haze value is low as compared with Comparative Examples, the parallel light transmittance is high as compared with Comparative Examples, and the transparency is improved. And, the molded products of Examples had small values YI, had yellow coloration suppressed and were close to colorless transparency.

Further, with respect to Examples 14 to 16, the molded product in Example 14 employing aminosilane+polyester non-yellowing urethane resin, as a binder component, is superior in the mechanical properties to the molded product in Example 15 employing aminosilane+bisphenol A epoxy resin, or in Example 16 employing aminosilane+acrylic resin, and the haze value is low, the parallel light transmittance is high, and the transparency is high. Further, the value YI is small, and yellow coloration is suppressed, and the molded product was close to colorless transparency.

The glass filler for a polycarbonate resin obtainable by the present invention, and the polycarbonate resin composition employing it, are useful for molded products required to have both physical properties of transparency and strength, such as covers for display portions of electric or electronic appliances, or substitutes for plate glass to be used for automobiles or building materials.

The entire disclosures of Japanese Patent Application No. 2005-328108 filed on Nov. 11, 2005 and Japanese Patent Application No. 2006-261800 filed on Sep. 27, 2006 including specifications, claims and summaries are incorporated herein by reference in their entireties.

What is claimed is:

1. A glass filler in the form of fiber, milled fiber, powder or flakes for a polycarbonate resin, which comprises, as inorganic components in the entire glass filler, from 50 to 60 mass % of silicon dioxide ($SiO_2$),
from 7 to 9.9 mass % of aluminum oxide ($Al_2O_3$),
from 10 to 20 mass % of calcium oxide (CaO),
from 0 to 5 mass % of magnesium oxide (MgO),
from 3 to 6 mass % of zirconium oxide ($ZrO_2$),
from 0 to 10 mass % of zinc oxide (ZnO),
from 0 to 10 mass % of strontium oxide (SrO),
from 7 to 14 mass % of barium oxide (BaO),
from 0 to 2 mass % of lithium oxide ($Li_2O$),
from 0 to 2 mass % of sodium oxide ($Na_2O$), and
from 0 to 2 mass % of potassium oxide ($K_2O$),
provided that:
the total content of the lithium oxide ($Li_2O$), the sodium oxide ($Na_2O$) and the potassium oxide ($K_2O$) is from 0 to 1.5 mass % based on the entire glass filler,
the total content of titanium oxide ($TiO_2$) is 0.1 mass % or less,
the total content of boron oxide ($B_2O_3$) is 0.1 mass % or less,
the total content of the calcium oxide (CaO, the zinc oxide (ZnO), the strontium oxide (SrO) and the barium oxide (BaO) is from 25 to 35 mass %,
the total content of the $SiO_2$ and the $Al_2O_3$ is from 57 to 67 mass %, and
the glass has a refractive index of from 1.581 to 1.587 to a light with a wavelength of 589 nm.

2. The glass filler for a polycarbonate resin according to claim 1, wherein the total content of the zinc oxide (ZnO), the strontium oxide (SrO) and the barium oxide (BaO) is from 5 to 20 mass % based on the entire glass filler.

3. The glass filler for a polycarbonate resin according to claim 1, which is in the form of fiber.

4. A polycarbonate resin composition comprising the glass filler as defined in claim 1 and a polycarbonate resin.

5. The polycarbonate resin composition according to claim 4, wherein the content of the glass filler is from 5 to 60 mass %.

6. The polycarbonate resin composition according to claim 4, wherein the difference between the refractive index of the polycarbonate resin and the refractive index of the glass filler is not more than 0.001 to a light with a wavelength of 589 nm.

7. The polycarbonate resin composition according to claim 4, which, when formed into a flat plate having a thickness of from 0.1 to 5 mm, has a parallel light transmittance of at least 65%.

8. The glass filler according to claim 1, wherein the $Al_2O_3$ is present in an amount of from 7 to 9.8 mass %.

* * * * *